Nov. 8, 1955   E. B. PARKES   2,722,708
VEHICLE WIND-SCREEN WIPERS
Filed April 17, 1953
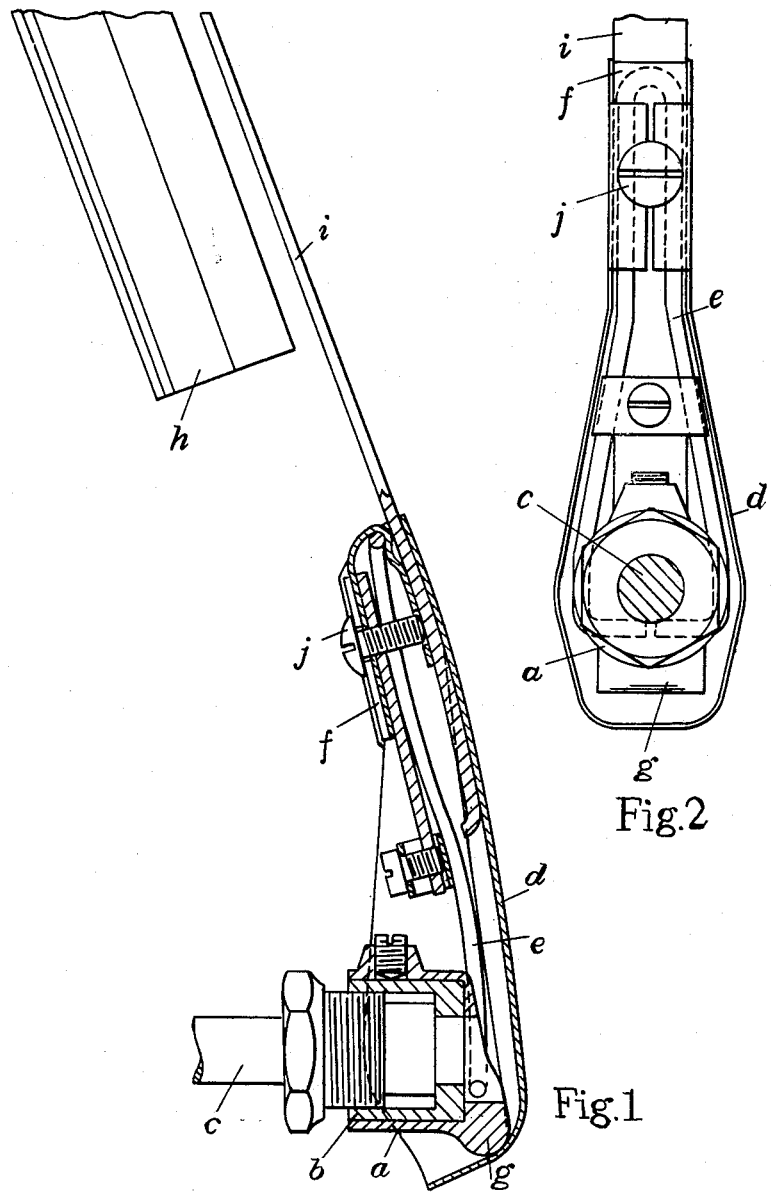

United States Patent Office 2,722,708
Patented Nov. 8, 1955

2,722,708

VEHICLE WIND-SCREEN WIPERS

Eric Bernard Parkes, Birmingham, England, assignor to Joseph Lucas (Industries) Limited, Birmingham, England Application April 17, 1953, Serial No. 349,399

2 Claims. (Cl. 15—255)

This invention relates to vehicle wind-screen wipers of the oscillatory-arm type, and has for its object to provide an improved interconnection of the arm and its actuating spindle.

The invention comprises the combination of a boss secured, or adapted to be secured, to the driving spindle, an arm part, and a spring which is anchored at one end to the arm part and pivotally attached at its other end to the boss, the boss having formed thereon a cam-like protuberance or nosepiece adapted to co-operate with a curved surface on the inner side of the arm part.

In the accompanying drawings:

Figure 1 is a sectional side elevation and Figure 2 a rear elevation illustrating an embodiment of the invention.

Referring to the drawings, there is provided a boss $a$ of cylindrical form, this being secured, or adapted to be secured (by a collet $b$ or other means) to the outer end of the driving spindle $c$. There is also provided an arm part $d$ which is shaped on one side to a channel section such that one end of the boss can lie in the channel. The two parts are interconnected by a spring $e$. This may be in the form of a blade made from metal strip, or it may (as shown) be made from a length of stiff steel wire which is folded to form a pair of side members. At one end the spring is secured by a clamp $f$ to the inner side of the arm part, and at the other end it is pivotally attached to the boss, the pivotal connection in this example being effected by inturned ends of the wire spring engaging opposite ends of a hole in the boss.

At the underside of the forward end of the boss is formed a cam-like protuberance or nose-piece $g$, and the adjacent portion of the arm part is shaped to a curved form against which the nose-piece is held in contact by the spring.

The wiper blade $h$ is carried on an extension $i$ of the arm part, which extension is adjustably secured at one end to the arm part by a screw $j$.

The arrangement is such that oscillation of the driving spindle effects oscillation of the arm part, and so far as this motion is concerned the spring acts as a rigid connection between the boss and arm part. The arm part can, however, move pivotally in a direction at right angles to the surface of the wind-screen for maintaining the wiper blade in contact with the wind-screen surface, the nose-piece $g$ on the boss (by its co-operation with the adjacent curved surface on the arm part $d$) serving as a fulcrum about which the arm part can rock under the control of the spring.

By this invention a spring-controlled pivotal connection between the arm and its driving spindle is effected in a very simple and convenient manner.

Having thus described my invention what I claim as new and desire to secure by Letters Patent is:

1. Means for pivotally interconnecting a vehicle windshield wiper arm and its actuating spindle including an arm part including a major portion extending from one side of the axis of the spindle and a minor portion extending beyond the opposite side of the axis of the spindle, said portions being in longitudinal alignment, a boss member, means for connecting the boss member to the spindle, an elongated spring means, means anchoring one end of the spring means to the major portion of the arm part, means pivotally connecting the other end of the spring means and thus the arm part to the boss member for swinging movement about an axis extending transversely of the spindle axis, said boss member having a protuberance extending therefrom and lying on the side of the spindle axis adjacent the minor portion of the arm part, said protuberance being arcuate in cross section, the minor portion of the arm part including a curved portion and said spring means holding said curved portion against the protuberance so that the protuberance constitutes a fulcrum about which the arm part can rock under the control of the spring means.

2. Means for pivotally interconnecting a vehicle windshield wiper arm and its actuating spindle as defined in and by claim 1 in which the spring means is a wire spring including two legs and an interconnecting bight portion, the means anchoring one end of the spring means to the major portion of the arm part including clamp means cooperable with the wire adjacent the interconnecting bight portion, the said boss member having an aperture therethrough extending transversely of the axis of the spindle, said legs including terminal end portions bent to extend toward each other in substantial alignment and said terminal bent end portions lying in the hole in the boss member.

References Cited in the file of this patent

UNITED STATES PATENTS

| 1,946,073 | Horton | Feb. 6, 1934 |
| 2,136,909 | Scofield | Nov. 15, 1938 |

FOREIGN PATENTS

| 689,753 | Great Britain | Apr. 1, 1953 |